United States Patent Office 3,467,661
Patented Sept. 16, 1969

3,467,661
N-FLUORO-DERIVATIVES OF ALKYL SUBSTITUTED PIPERIDINES
David Milton Gardner, Collegeville, and Robert Helitzer, King of Prussia, Pa., assignors to Pennsalt Chemicals Corporation, Philadelphia, Pa., a corporation of Pennsylvania
No Drawing. Filed Aug. 5, 1965, Ser. No. 477,579
Int. Cl. C07d 29/02, 29/20
U.S. Cl. 260—293                    15 Claims

ABSTRACT OF THE DISCLOSURE

Perchloryl fluoride is reacted with a substituted piperidine having the formula

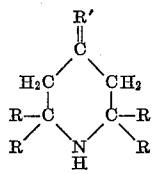

where R is hydrogen or alkyl having 1 to 3 carbon atoms, at least two of the R groups being alkyl, and R' is oxygen or two hydrogen atoms, to prepare an N-fluoro derivative of the formula

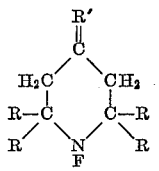

The N-fluoro-alkyl substituted piperidines are useful as herbicides, fungicides or insecticides.

---

This invention relates to new N-fluoro derivatives and chlorate adducts of substituted piperidines and to the method for their preparation. More particularly, this invention concerns N-fluoro derivatives and chlorate adducts of alkyl substituted piperidines obtained by reacting an alkyl substituted piperidine with perchloryl fluoride.

It is known that piperidine in aqueous solution reacts with perchloryl fluoride to form N-perchlorylpiperidine, i.e.,

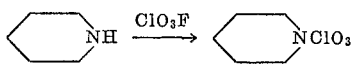

(See "Preparation of N-Perchlorylpiperidine," D. M. Gardner, R. Helitzer and C. J. Mackley, Journal of Organic Chemistry, vol. 29, 1964, page 3738). However, N-perchlorylpiperidine is a dangerously sensitive and unstable compound which explodes with moderate heating or on contact with anhydrous piperidine. It is so unstable that it decomposes slowly at temperatures as low as 25° C.

We have now discovered that reacting perchloryl fluoride with ring-substituted alkyl piperidines produces new N-fluoro derivatives of the alkyl piperidines and relatively stable chlorate adducts of the said piperidines. The reaction of the substituted piperidines with perchloryl fluoride as herein-described is the only method known to us for preparing the novel N-fluoro piperidine derivatives.

The ring-substituted alkyl piperidine reacted with perchloryl fluoride according to the present invention is of the formula

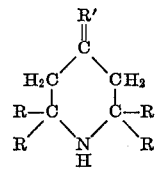

wherein the R substitutents attached to the ring carbons are independently selected from the class consisting of hydrogen and alkyl groups having from 1 to 3 carbon atoms (i.e., methyl, ethyl, propyl, and isopropyl) and R' is oxygen or two hydrogen atoms, said compound further characterized in that at least two of said R substituents are alkyl. The preferred compounds of the foregoing class employed in the process of this invention are 2,6-dimethylpiperidine, 2,2,6,6-tetramethylpiperidine and 2,2,6,6-tetramethylpiperidine-4-one.

The new N-fluoro-alkyl substituted derivatives of piperidine embodied in this invention have the structure

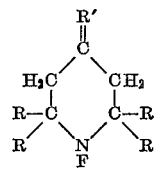

where R is independently selected from the class consisting of hydrogen and alkyl groups having 1 to 3 carbon atoms at least two of the R substituents being alkyl groups, and R' is oxygen or two hydrogen atoms. The N-fluoro-alkyl substituted piperidines are useful as herbicides, fungicides or insecticides.

The new chlorate adducts of alkyl substituted piperidines embodied herein have the structure

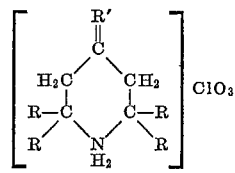

where the substituents R and R' attached to the ring carbon atoms are as previously defined. These adducts find utility as ingredients in explosive compositions.

According to the process of this invention, the aforesaid alkyl-substituted piperidine is contacted with gaseous perchloryl fluoride for a period of time sufficient to ensure reasonably complete reaction of the piperidine, generally from about 10 to 120 minutes being adequate. The reaction temperature is in general within the range of about 0 to about 50° C. with from about 20 to about 35° C. being preferred. The product of the reaction is a mixture of the aforesaid chlorate adduct and the N-fluoro derivative, which components are recovered and separated from the reaction mixture by well-known techniques such as described below.

In the preferred embodiment the reaction is carried out in an inert organic solvent for the alkyl-substituted piperidine. Examples of suitable solvents are hydrocarbons such as petroleum ether, hexane, heptane, octane and the like, oxygenated hydrocarbons such as diethyl ether and ethyl acetate, and chlorinated hydrocarbons such as carbon tetrachloride, 1,1,2-trifluoro-2,2,1-trichloroethane, chloroform, dichloroethane, methylene chloride and the like. The chlorate adduct normally is a high-melting solid which is insoluble in the organic solvent (diluent) whereas the N-fluoro derivative is soluble in the solvent. Thus, the two products are conveniently separated by filtration of the reaction mixture. The N-fluoro derivative subsequently is recovered from the filtrate by removal of the solvent by distillation. The N-fluoro derivative is usually an oily liquid material. The molar ratio of the chlorate adduct to the N-fluoro derivative in the product mixture obtained according to this process generally ranges from about 1:1 to 4:1.

In a less preferred embodiment, the reaction can be carried out in an aqueous diluent, in which system the alkyl substituted piperidine starting material has limited solubility. However, the products may or may not be soluble in the aqueous diluent depending upon the characteristics of the compounds being prepared. An aqueous system is less preferred for the reaction because of the tendency of the N-fluoro derivatives to undergo hydrolysis.

The following examples are presented to illustrate and clarify the invention and should not be regarded as limiting the scope thereof which is defined by the appended claims.

Example I.—Preparation of N-fluoro-2,6-dimethylpiperidine

Gaseous perchloryl fluoride is passed through a solution of 5.66 grams (0.05 mole) of 2,6-dimethylpiperidine in 200 ml. of anhydrous diethyl ether for 30 minutes at a temperature of from 24 to 31° C. The white salt, which forms during the reaction and is isolated by filtration of the slurry under a nitrogen blanket, is 2,6-dimethylpiperidinium chlorate having the structure

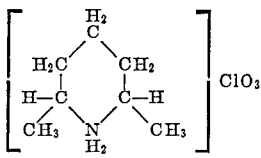

and a melting point of 83.5–85.0° C. The amount of this product recovered is 4.3 grams, a yield of 87.1%

The filtrate is dried over MgSO$_4$ crystals and the ether is evaporated at room temperature using a nitrogen purge. The residue is a pale yellow oil which is N-fluoro-2,6-dimethylpiperidine,

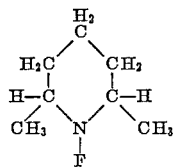

This product, when left exposed to the air for about two hours, gradually darkens and becomes a water-soluble brown sludge.

EXAMPLE II.—Preparation of N-fluoro-2,2,6,6-tetramethylpiperdine

A vigorous stream of gaseous ClO$_3$F is passed through an aqueous solution of 1.4 grams (0.01 mole) of 2,2,6,6-tetramethylpiperidine in 100 ml. water for 30 minutes at about 25° C. The solution, originally colorless, becomes an orange-brown color as reaction proceeds. The solution is treated with diethyl ether and the ether solvent is evaporated from the organic extract phase to yield an orange oil, N-fluoro-2,2,6,6-tetramethylpiperidine.

EXAMPLE III

The reaction described in Example II is repeated in two runs using 1,1,2-trifluoro-1,2,2-trichloro ethane and carbon tetrachloride as reaction solvents, respectively. Insoluble tetramethylpiperidinium chlorate formed during reaction is separated from the reaction mixture by filtration. The melting point of this compound.

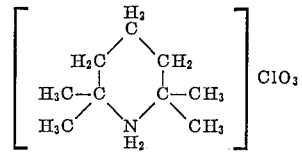

is 238–239° C., at which temperature it decomposes violently. The solvent is evaporated from the filtrate to yield the orange oil, N-fluoro-2,2,6,6-tetramethylpiperidine,

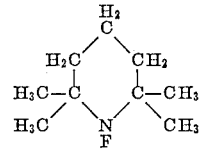

The molar ratio of the chlorate product to the fluoro derivative product is about 4:1.

EXAMPLE IV

The reaction of Example II is repeated using as the starting material a suspension of the tetramethylpiperidine, which is only slightly water-soluble, in 2% sodium hydroxide solution. When the mixture is treated with gaseous ClO$_3$F, the orange, oily product quickly forms and floats on the surface. The oil is extracted from the aqueous mixture with diethyl ether, the extract phase is dried over Na$_2$SO$_4$ crystals, and the ether is evaporated. The orange, oily residue is purified by vacuum distillation (B.P. about 28° C. at 0.5 mm. Hg) to give a clear, colorless oil identified as N-fluoro-2,2,6,6-tetramethylpiperidine by mass spectrometric and infrared analysis techniques.

EXAMPLE V.—Preparation of N-fluoro-2,2,6,6-tetramethylpiperidine-4-one

Gaseous ClO$_3$F is passed into a solution of 10 grams of 2,2,6,6-tetramethylpiperidine-4-one in 200 ml. diethyl ether for about 40 minutes at 25° C. A white solid is formed during the reaction and is recovered from the reaction mixture by filtration. This solid is identified as 2,2,6,6-tetramethylpiperidine-4-one hydrochlorate (7.1 grams, 92.2% yield),

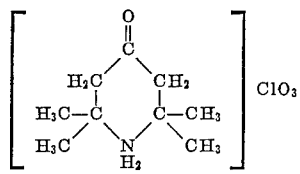

*Analysis.*—C, 45.87; H, 7.86; N, 6.31; Cl, 14.76; (Calculated for C$_9$H$_{18}$NClO$_4$; C, 45.1; H, 7.57; N, 5.84; Cl, 14.79). The melting point of the hydrochlorate is 174° C., at which temperature it decomposes.

The diethyl ether in the light yellow filtrate is flash evaporated to give a residue of 4.5 grams (81% yield) of crude N-fluoro-2,2,6,6-tetramethylpiperidine-4-one,

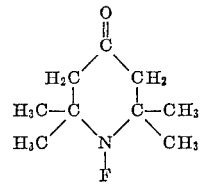

The crude product is vacuum distilled with the main fraction recovered at 70° C. and 2 mm. Hg pressure.

*Analysis.*—C, 62.41; H, 9.62; N, 7.94; F, 10.83. (Calculated for C$_9$H$_{16}$NOF: C, 62.4; H, 9.31; N, 8.09; F, 10.97). The structure is confirmed by infrared spectral analysis. The compound's refractive index is measured as $n_D^{29} = 1.4518$.

We claim:
1. A compound of the formula

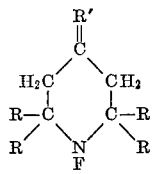

where R is independently selected from the class consisting of hydrogen and alkyl groups having 1 to 3 carbon atoms, at least two of the R substituents being alkyl groups, and R' is oxygen or two hydrogen atoms.

2. A compound according to claim 1 wherein R is methyl.
3. A compound according to claim 1 wherein R is ethyl.
4. A compound according to claim 1 wherein R is propyl.
5. A compound according to claim 1 wherein R is isopropyl.
6. N-fluoro-2,6-dimethylpiperidine.
7. N-fluoro-2,2,6,6-tetramethylpiperidine.
8. N-fluoro-2,2,6,6-tetramethylpiperidine-4-one.
9. A process for preparing N-fluoro derivatives of alkyl substituted piperidines which comprises contacting at from about 0° C. to about 50° C. perchloryl fluoride with a compound of the formula

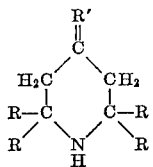

where R is independently selected from the class consisting of hydrogen and alkyl groups having 1 to 3 carbon atoms, at least two of the R substituents being alkyl groups, and R' is oxygen or two hydrogen atoms, and separating the N-fluoro alkyl substituted piperidine from by-product chlorate adduct of the alkyl substituted piperidine.

10. The process of claim 9 wherein R is methyl.

11. A process according to claim 14 which comprises contacting 2,6-dimethylpiperidine with gaseous perchloryl fluoride.
12. A process according to claim 14 which comprises contacting 2,2,6,6-tetramethylpiperidine with gaseous perchloryl fluoride.
13. A process according to claim 14 which comprises contacting 2,2,6,6-tetramethylpiperdine-4-one with gaseous perchloryl fluoride.
14. A process for preparing N-fluoro derivatives of alkyl substituted piperidines which comprises contacting gaseous perchloryl fluoride with a compound of the formula

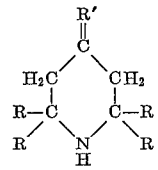

where R is independently selected from the class consisting of hydrogen and alkyl groups having 1 to 3 carbon atoms, at least two of the R substituents being alkyl groups, and R' is oxygen or two hydrogen atoms, in an inert organic solvent at from about 0° C. to about 50° C., and separating the N-fluoro alkyl substituted piperidine from by-product chlorate adduct of the alkyl substituted piperidine.

15. The process of claim 14 wherein the contact is at a temperature within the range of about 20° C. to about 35° C.

References Cited

UNITED STATES PATENTS 2,490,098  12/1949  Simons.
2,975,185   3/1961  Anderson et al.
3,153,613  10/1964  Jones et al.
3,332,955   7/1967  Mackley _____ 260—293

HENRY R. JILES, Primary Examiner

F. D. LEWIS, Assistant Examiner

U.S. Cl. X.R.

71—94; 260—294.7, 999